United States Patent
Baer et al.

(10) Patent No.: US 12,381,756 B2
(45) Date of Patent: Aug. 5, 2025

(54) REDUCED POWER SOURCE OPERATION IN A POWER SYSTEM OF A VESSEL

(71) Applicant: Caterpillar Inc., Peoria, IL (US)

(72) Inventors: Marvin Karl Baer, Edelstein, IL (US); Kraig Matthew Love, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 336 days.

(21) Appl. No.: 18/180,546

(22) Filed: Mar. 8, 2023

(65) Prior Publication Data

US 2024/0305498 A1  Sep. 12, 2024

(51) Int. Cl.
*H04L 12/40* (2006.01)

(52) U.S. Cl.
CPC .... *H04L 12/40* (2013.01); *H04L 2012/40286* (2013.01)

(58) Field of Classification Search
CPC ............ H04L 12/40; H04L 2012/40286; H02J 2310/42; H02J 4/00
See application file for complete search history.

(56) References Cited

U.S. PATENT DOCUMENTS

| | | | |
|---|---|---|---|
| 8,946,928 B2 | 2/2015 | Boe | |
| 9,543,748 B2 | 1/2017 | Andersen et al. | |
| 10,084,319 B2 | 9/2018 | Lindtjørn et al. | |
| 10,164,430 B2 | 12/2018 | Stromsvik et al. | |
| 2008/0246337 A1* | 10/2008 | Michalko | B60R 16/023 307/45 |
| 2010/0284117 A1* | 11/2010 | Crane | H02J 4/00 361/93.1 |
| 2017/0373502 A1 | 12/2017 | Gjerpe et al. | |
| 2018/0034280 A1 | 2/2018 | Pedersen | |
| 2020/0180454 A1* | 6/2020 | Gao | H02J 7/14 |
| 2021/0031887 A1 | 2/2021 | Van Ravens | |
| 2021/0347459 A1 | 11/2021 | Lipponen et al. | |

FOREIGN PATENT DOCUMENTS

| | | |
|---|---|---|
| CN | 114600331 A | 6/2022 |
| CN | 113541212 B * | 9/2023 |
| EP | 2869420 A1 | 5/2015 |

(Continued)

OTHER PUBLICATIONS

European Search Report for EP Patent Appln. No. 24157483.9, mailed Aug. 13, 2024 (9 pgs).

*Primary Examiner* — Rexford N Barnie
*Assistant Examiner* — Thai H Tran

(57) ABSTRACT

A power system of a vessel includes a first AC bus; a second AC bus; a bus tie that electrically disconnects the first AC bus and the second AC bus when in an open position; a first power source and a first set of one or more non-propulsion components of the vessel that are electrically connected to the first AC bus; a second power source and a second set of one or more non-propulsion components of the vessel that are electrically connected to the second AC bus; a DC bus; a first transformer that galvanically isolates the DC bus from the first AC bus; a second transformer that galvanically isolates the DC bus from the second AC bus; a first AC/DC inverter coupled between the first AC bus and the DC bus; and a second AC/DC inverter coupled between the second AC bus and the DC bus.

20 Claims, 4 Drawing Sheets

(56) References Cited

FOREIGN PATENT DOCUMENTS

| | | |
|---|---|---|
| EP | 3209556 B1 | 4/2016 |
| EP | 2723635 B1 | 3/2019 |
| KR | 101629195 B1 | 6/2016 |
| NO | 343384 B1 | 2/2019 |
| WO | 2021078992 A1 | 4/2021 |

* cited by examiner ced POWER SOURCE OPERATION IN
A POWER SYSTEM OF A VESSEL

TECHNICAL FIELD

The present disclosure relates generally to a power system of a vessel and, for example, to reduced power source operation in a power system of a vessel.

BACKGROUND

A power system in a vessel (e.g., a marine vessel) generates and provides electrical power to facilitate generation of propulsion or thrust to allow the vessel to move (e.g., through water) and to power other critical systems of the vessel, such as a ballast system, a fuel system, and a communication system. In many cases, the power system includes multiple power sources, such as multiple generator sets, that generate and provide alternating current (AC) power. A first power source may be associated with a first AC bus (e.g., that may be associated with a first side of the vessel, such as a port side), and a second power source may be associated with a second AC bus (e.g., that may be associated with a second side of the vessel such as a starboard side of the vessel). In a typical operation mode, the first AC bus and the second AC bus may be connected via a bus tie (e.g., that is in a closed position) to allow electrical power generated by the first power source and the second power source to be provided to vessel components connected to the first AC bus and the second AC bus. In some cases, such as when the vessel is moving within a dynamic position (DP) zone (e.g., within a close proximity of a target location, such as an offshore rig), the power system may need to operate in a redundant operation mode where the bus tie is in an open position. This may be, for example, to prevent propagation of electrical shorts, faults, and/or other electrical disturbances between the first AC bus and the second AC bus, which thereby decreases a likelihood that the entire power system will fail if one AC bus and/or its electrically connected components fail.

The power system operating in the redundant mode, however, requires that the both the first power source and the second power source operate to provide respective electrical power for the first AC bus and its components and for the second AC bus and its components. This is true even though electrical power demands for operating in the DP zone are typically lower than when operating in other zones (e.g., because the vessel typically moves at a lower speed in the DP zone than the other zones, and therefore less electrical power is required to power propulsion components). Consequently, in many cases, extra fuel is consumed by the first power source and the second power to generate more electrical power than is actually needed to power components of the vessel. This, in turn, can needlessly generate unwanted emissions, such as carbon dioxide, nitrogen oxides, sulfur dioxide, and particulate matter (e.g., in addition to burning additional fuel).

The power system of the present disclosure solves one or more of the problems set forth above and/or other problems in the art.

SUMMARY

A power system of a vessel includes a first AC bus; a second AC bus; a bus tie that electrically connects the first AC bus and the second AC bus when in a closed position, and that electrically disconnects the first AC bus and the second AC bus when in an open position; a first power source that is electrically connected to the first AC bus; a second power source that is electrically connected to the second AC bus; a direct current (DC) bus; a first transformer that galvanically isolates the DC bus from the first AC bus; a second transformer that galvanically isolates the DC bus from the second AC bus; a first AC/DC inverter coupled between the first AC bus and the DC bus; a second AC/DC inverter coupled between the second AC bus and the DC bus; a first set of one or more propulsion components of the vessel that are electrically connected to the first AC bus; a second set of one or more propulsion components of the vessel that are electrically connected to the second AC bus; a first set of one or more non-propulsion components of the vessel that are electrically connected to the first AC bus; and a second set of one or more non-propulsion components of the vessel that are electrically connected to the second AC bus, wherein: the first power source, when the first power source is operating, is configured to provide electrical power to the first AC bus, wherein, when the second power source is not operating and the bus tie is in the open position, the first power source providing the electrical power to the first AC bus allows: a first portion of the electrical power to be provided to the first set of one or more propulsion components via the first AC bus, a second portion of the electrical power to be provided to the first set of one or more non-propulsion components via the first AC bus, and a third portion of the electrical power to be provided to the second AC bus via the first AC bus, the first transformer, the first AC/DC inverter, the DC bus, the second AC/DC inverter, and the second transformer, wherein: a first sub-portion of the third portion of the electrical power is provided to, via the second AC bus, the second set of one or more propulsion components, and a second sub-portion of the third portion of the electrical power is provided to, via the second AC bus, the second set of one or more non-propulsion components.

A power system of a vessel includes a first AC bus; a second AC bus; a bus tie that electrically connects the first AC bus and the second AC bus when in a closed position, and that electrically disconnects the first AC bus and the second AC bus when in an open position; a first power source that is electrically connected to the first AC bus; a second power source that is electrically connected to the second AC bus; a DC bus; a first AC/DC inverter coupled between the first AC bus and the DC bus; a second AC/DC inverter coupled between the second AC bus and the DC bus; a first set of one or more non-propulsion components of the vessel that are electrically connected to the first AC bus; and a second set of one or more non-propulsion components of the vessel that are electrically connected to the second AC bus, wherein: the first power source, when the first power source is operating, is configured to provide electrical power to the first AC bus, wherein, when the second power source is not operating and the bus tie is in the open position, the first power source providing the electrical power to the first AC bus allows: a portion of the electrical power to be provided to the second AC bus via the first AC bus, the first AC/DC inverter, the DC bus, and the second AC/DC inverter, wherein: a sub-portion of the portion of the electrical power is provided to, via the second AC bus, the second set of one or more non-propulsion components.

A method includes receiving, by a controller of a power system of a vessel, an indication that the power system is to operate in a reduced power source operation mode; identifying, by the controller and based on receiving the indication that the power system is to operate in the reduced power source operation mode, that a first power source of the power system is operating, wherein the first power source is electrically connected to a first AC bus of the power system; identifying, by the controller and based on receiving the indication that the power system is to operate in the reduced power source operation mode, that a second power source of the power system is not operating, wherein the second power source is electrically connected to a second AC bus of the power system; identifying, by the controller and based on receiving the indication that the power system is to operate in the reduced power source operation mode, that a bus tie of the power system is in a closed position, wherein the bus tie electrically connects the first AC bus and the second AC bus when in the closed position, and electrically disconnects the first AC bus and the second AC bus when in an open position; and providing, by the controller and based on receiving the indication that the power system is to operate in the reduced power source operation mode, identifying that the first power source is operating, identifying that the second power source is not operating, and identifying that the bus tie is in the closed position, information indicating that the first power source is operating, that the second power source is not operating, and that the bus tie is in the closed position, wherein providing the information indicating that the first power source is operating, that the second power source is not operating, and that the bus tie is in the closed position allows the bus tie to be in the open position, which allows the first power source to provide electrical power to the first AC bus, wherein the first power source providing the electrical power to the first AC bus allows a portion of the electrical power to be provided to the second AC bus via the first AC bus, a first AC/DC inverter of the power system, a DC bus of the power system, and a second AC/DC inverter of the power system.

DETAILED DESCRIPTION

This disclosure relates to reduced power source operation in a power system of a vessel (e.g., a marine vessel), but is applicable to any power system that includes multiple power sources that are associated with respective AC buses.

Figure 1:
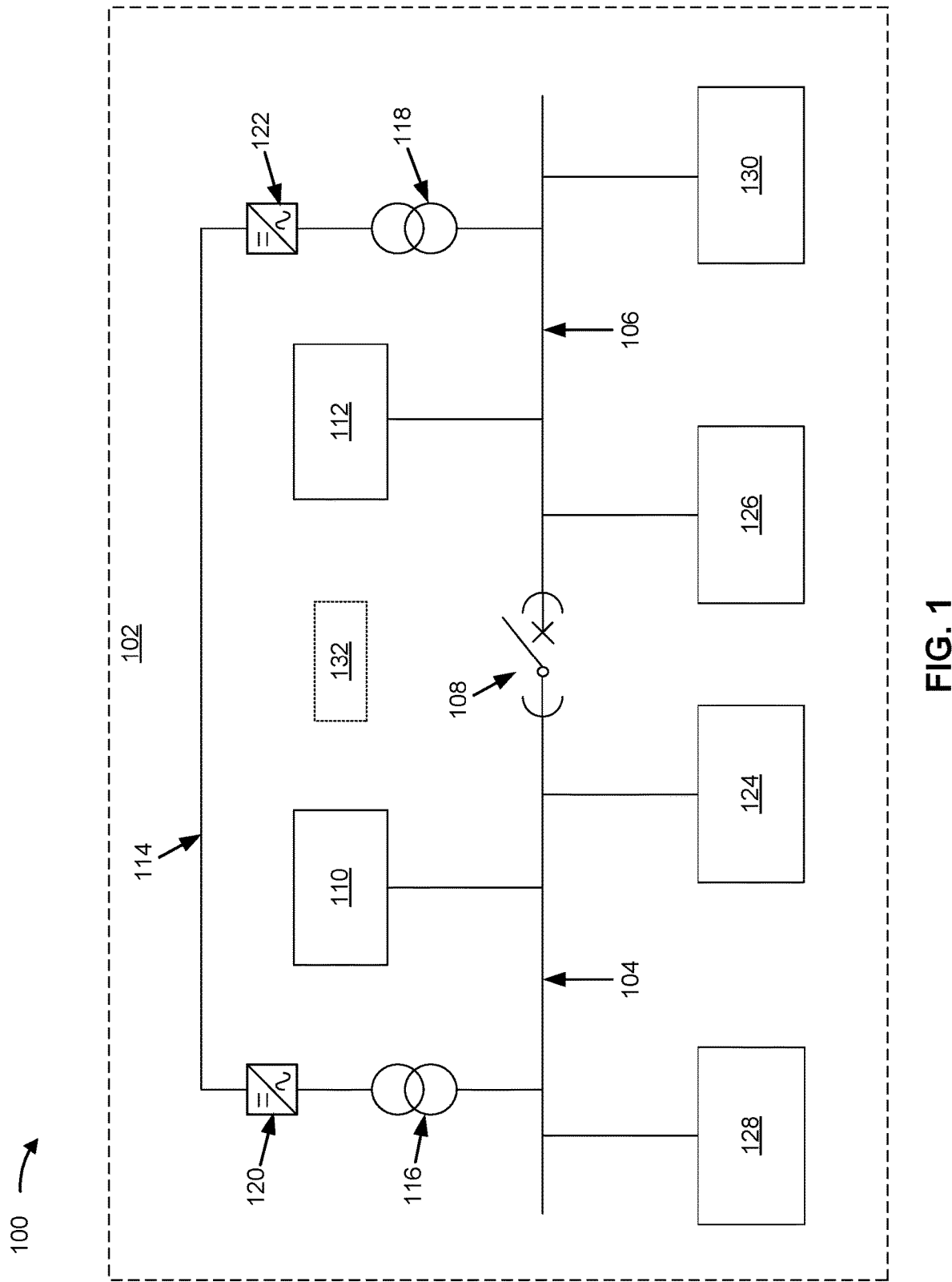
FIG. 1 is a diagram of an example implementation described herein.

FIG. 1 is a diagram of an example implementation 100 described herein. As shown in FIG. 1, the implementation 100 may include a power system 102, which may comprise a first AC bus 104, a second AC bus 106, a bus tie 108, a first power source 110, a second power source 112, a DC bus 114, a first transformer 116, a second transformer 118, a first AC/DC inverter 120, a second AC/DC inverter 122, a first set of one or more propulsion components 124, a second set of one or more propulsion components 126, a first set of one or more non-propulsion components 128, a second set of one or more non-propulsion components 130, and/or a controller 132, among other examples. In some implementations, the power system 102 may be associated with a vessel (e.g., a marine vessel), a machine (e.g., a work machine), a vehicle, mobile machinery, stationary machinery, general industrial equipment, or any other machine or equipment.

The first AC bus 104 and the second AC bus 106 may each be an electrical bus that is configured to transmit electrical power (e.g., AC electrical power) to one or more components connected to the electrical bus. The bus tie 108 may be configured to electrically connect and/or to electrically disconnect (e.g., electrically isolate) the first AC bus 104 and the second AC bus 106. For example, the bus tie 108 may electrically connect the first AC bus 104 and the second AC bus 106 when in a closed position (e.g., in a closed circuit breaker position), and may electrically disconnect the first AC bus 104 and the second AC bus 106 when in an open position (e.g., in an open circuit breaker position). Accordingly, the first AC bus 104 and the second AC bus 106 may act as a single, unified AC bus when the bus tie 108 is in the closed position, and, alternatively, may act as multiple, isolated AC buses when the bus tie 108 is in the open position.

Each power source, of the first power source 110 and the second power source 112, may be configured to generate electrical power (e.g., AC electrical power) when the power source is operating. Each power source may include, for example, a generator set (e.g., a "genset"), an internal combustion engine (e.g., a diesel engine, a gas engine, or a dynamic gas blending engine (DGB)), and/or other machinery or equipment that generates electrical power. The first power source 110 may be electrically connected to the first AC bus 104. Therefore, the first power source 110 may be configured to provide electrical power to the first AC bus 104 (e.g., when the first power source 110 is operating). Additionally, or alternatively, the second power source 112 may be electrically connected to the second AC bus 106. Therefore, the second power source 112 may be configured to provide electrical power to the second AC bus 106 (e.g., when the second power source 112 is operating).

The DC bus 114 may be an electrical bus that is configured to transmit electrical power (e.g., DC electrical power) to one or more components connected to the electrical bus. As shown in FIG. 1, the DC bus 114 may be electrically connected to the first AC bus 104 via the first AC/DC inverter 120 (and the first transformer 116), and may be electrically connected to the second AC bus 106 via the second AC/DC inverter 122 (and the second transformer 118).

The first transformer 116 may be configured to galvanically isolate the DC bus 114 from the first AC bus 104. The second transformer 118 may be configured to galvanically isolate the DC bus 114 from the second AC bus 106. In this way, the first transformer 116 and the second transformer 118 may prevent propagation of electrical shorts, faults, and/or other electrical disturbances, between the DC bus 114 and the first AC bus 104 and the second AC bus 106.

The first AC/DC inverter 120 and the second AC/DC inverter 122 may be configured to convert AC electrical power to DC electrical power, and vice versa. The first AC/DC inverter 120 may be coupled between the first AC bus 104 and the DC bus 114, and may therefore facilitate electrical power propagating between the first AC bus 104 and the DC bus 114. The second AC/DC inverter 122 may be coupled between the second AC bus 106 and the DC bus 114, and may therefore facilitate electrical power propagating between the second AC bus 106 and the DC bus 114.

The first set of one or more propulsion components 124 and the second set of one or more propulsion components 126, when the power system 102 is associated with a vessel, may include propulsion components of the vessel that facilitate (e.g., that directly facilitate) generation of propulsion or thrust to allow the vessel to move (e.g., through water). Each of the first set of one or more propulsion components 124 and the second set of one or more propulsion components 126 may include, for example, at least one of a propeller, a thruster, a rudder, or another component that is associated with a propulsion system of the vessel. The first set of one or more propulsion components 124 may be electrically connected to the first AC bus 104. Accordingly, the first set of one or more propulsion components 124 may be powered by electrical power provided to the first AC bus 104. The second set of one or more propulsion components 126 may be electrically connected to the second AC bus 106. Accordingly, the second set of one or more propulsion components 126 may be powered by electrical power provided to the second AC bus 106.

The first set of one or more non-propulsion components 128 and the second set of one or more non-propulsion components 130, when the power system 102 is associated with a vessel, may include non-propulsion components of the vessel that do not facilitate (e.g., do not directly facilitate) generation of propulsion or thrust to allow the vessel to move (e.g., through water). Non-propulsion components, for example, may facilitate (e.g., directly facilitate) operation and/or safety of the vessel. Each of the first set of one or more non-propulsion components 128 and the second set of one or more non-propulsion components 130 may include, for example, at least one of a pump, a valve, a compressor, or another component that are associated with a ballast system, a fuel system, a freshwater system, a communications system, a navigation system, and/or an environmental system (e.g., that manages the vessel's heating and cooling, ventilation, and/or wastewater) of the vessel. The first set of one or more non-propulsion components 128 may be electrically connected to the first AC bus 104. Accordingly, the first set of one or more non-propulsion components 128 may be powered by electrical power provided to the first AC bus 104. The second set of one or more non-propulsion components 130 may be electrically connected to the second AC bus 106. Accordingly, the second set of one or more non-propulsion components 130 may be powered by electrical power provided to the second AC bus 106.

The controller 132 may be an electronic control module (ECM) or other computing device. The controller 132 may be in communication (e.g., by a wired connection or a wireless connection) with one or more components of the power system 102, such as the first power source 110, the second power source 112, and/or the bus tie 108. When the power system 102 is associated with a vessel, the controller 132 may be in communication with other components of the vessel, such as another controller (e.g., that controls one or more other systems of the vessel) or another component of the communications system, the navigation system, and/or another system of the vessel. The controller 132 may be configured to receive, transmit, process, generate, and/or provide information, as described elsewhere herein.

As described above, the first power source 110, when the first power source 110 is operating, may be configured to provide electrical power to the first AC bus 104. This allows respective portions of the electrical power to therefore be provided to the first set of one or more propulsion components 124 and the first set of one or more non-propulsion components 128 via the first AC bus 104 (e.g., to power the first set of one or more propulsion components 124 and the first set of one or more non-propulsion components 128). When the bus tie 108 is in the closed position, another portion of the electrical power may also be provided to the second AC bus 106, and therefore respective sub-portions of the other portion of the electrical power may be further provided to the second set of one or more propulsion components 126 and the second set of one or more non-propulsion components 130 via the second AC bus 106 (e.g., to power the second set of one or more propulsion components 126 and the second set of one or more non-propulsion components 130). In this way, the second power source 112 does not need to operate (e.g., to generate and provide additional electrical power) to power components that are electrically connected to the first AC bus 104 and the second AC bus 106 when the bus tie 108 is in the closed position and the first power source 110 is operating and providing electrical power.

Additionally, when the second power source 112 is not operating and the bus tie 108 is in the open position, the first power source 110, when the first power source 110 is operating, may be configured to provide electrical power to the first AC bus 104. This allows respective portions of the electrical power to therefore be provided to the first set of one or more propulsion components 124 and the first set of one or more non-propulsion components 128 via the first AC bus 104 (e.g., to power the first set of one or more propulsion components 124 and the first set of one or more non-propulsion components 128). This further allows another portion of the electrical power to be provided to the second AC bus 106 via the first AC bus 104, the first transformer 116, the first AC/DC inverter 120, the DC bus 114, the second AC/DC inverter 122, and/or the second transformer 118. That is, the other portion of the electrical power propagates from the first AC bus 104, to the DC bus 114, and then to the second AC bus 106. Accordingly, respective sub-portions of the other portion of the electrical power may be provided to the second set of one or more propulsion components 126 and the second set of one or more non-propulsion components 130 via the second AC bus 106 (e.g., to power the second set of one or more propulsion components 126 and the second set of one or more non-propulsion components 130). In this way, the second power source 112 does not need to operate (e.g., to generate and provide additional electrical power) to power components that are electrically connected to the second AC bus 106 when the bus tie 108 is in the open position and the first power source 110 is operating and providing electrical power.

While some implementations described herein are directed to the first power source 110 operating to generate and provide electrical power, and the second power source 112 not operating (e.g., not generating and providing electrical power), other implementations are also contemplated. For example, the second power source 112 may operate, and the first power source 110 may not operate. The second power source 112 may therefore generate and provide electrical power to the second AC bus 106, which may be provided to components electrically connected to the first AC bus 104 and the second AC bus 106 (e.g., when the bus tie 108 is in the closed position and/or the open position) in a similar manner as that described above. Accordingly, the first power source 110 may not need to operate (e.g., to generate and provide additional electrical power) to power components that are electrically connected to first AC bus 104.

In some implementations, the controller 132 may facilitate adjustment of the bus tie 108 (e.g., by facilitating of adjustment of the bus tie 108 from the closed position to the open position) as part of a control process that is associated with a reduced power source operation mode of the power system 102.

As part of the control process, the controller 132 may receive an indication that the power system 102 is to operate in the reduced power source operation mode. The reduced power source operation mode may indicate that the first power source 110 is to operate (or to remain operating), that the second power source 112 is to not operate (or to cease operating), and that the bus tie 108 is to be in the open position (or to remain in the open position).

The controller 132 may receive the indication from a user interface of the vessel (e.g., of a communications system of the vessel). For example, an operator of the vessel (e.g., a captain of the vessel) may interact with the user interface (e.g., via a touch screen display, a keyboard, a keypad, a mouse, a button, a switch, and/or a microphone of the user interface) to generate and provide the indication to the controller 132. The operator of the vessel may interact with the user interface to generate the indication when the vessel is within a physical distance threshold of a target location (e.g., a physical distance between the vessel and the target location is less than or equal to the physical distance threshold). This may be associated with a DP zone, such that operator of the vessel may be required to cause the power system 102 to operate in the reduced power source operation mode whenever the vessel is within the physical distance threshold of the target location (e.g., the vessel is in the DP zone). The physical distance threshold may be, for example, less than or equal to 250 meters (m), 500 m, 750 m, 1000 m, 1500 m, or 2000 m.

The operator may determine that the vessel is in the DP zone by consulting a navigation system (e.g., a global positioning system (GPS) of the navigation system) of the vessel and may thereby interact with the user interface to cause the indication to be provided to the controller 132. Alternatively, the navigation system may automatically determine that the vessel is in the DP zone (e.g., that the vessel is within the physical distance threshold of the target location), and may thereby generate and provide, to the controller 132, the indication that the power system 102 is to operate in the reduced power source operation mode.

As further part of the control process, the controller 132 (e.g., based on receiving the indication that the power system 102 is to operate in the reduced power source operation mode) may identify that the first power source 110 is operating (e.g., by communicating with the first power source 110 and/or a sensor associated with the first power source 110), identify that the second power source 112 is not operating (e.g., by communicating with the second power source 112 and/or a sensor associated with the second power source 112), and/or identify that the bus tie 108 is in the closed position (e.g., by communicating with the bus tie 108 and/or a sensor associated with the bus tie 108). In this way, controller 132 may identify information relevant to whether the power system 102 is ready to operate in the reduced power source operation mode.

As further part of the control process, the controller 132 (e.g., based on receiving the indication that the power system 102 is to operate in the reduced power source operation mode, identifying that the first power source 110 is operating, identifying that the second power source 112 is not operating, and/or identifying that the bus tie 108 is in the closed position) may provide information indicating that the first power source 110 is operating, that the second power source 112 is not operating, and/or that the bus tie 108 is in the closed position. This may allow the bus tie 108 to be in the open position. For example, the controller 132 may provide the information to another controller of the vessel, which may cause the bus tie 108 to be adjusted from the closed position to the open position. Additionally, or alternatively, the controller 132 may provide the information to a user interface of the vessel (e.g., of a communications system of the vessel) and/or to an operator of the vessel (e.g., a captain of the vessel), which may allow the operator (e.g., via the user interface of the vessel) to cause the bus tie 108 to be adjusted from the closed position to the open position.

Accordingly, allowing the bus tie 108 to be in the open position allows the first power source 110 to provide electrical power to the first AC bus 104, as described above. This allows a first portion of the electrical power to be provided to the first set of one or more propulsion components 124 via the first AC bus 104, a second portion of the electrical power to be provided to the first set of one or more non-propulsion components 128 via the first AC bus 104, and a third portion of the electrical power to be provided to the second AC bus 106 via the first AC bus 104, the first transformer 116, the first AC/DC inverter 120, the DC bus 114, the second AC/DC inverter 122, and the second transformer 118. This further allows a first sub-portion of the third portion of the electrical power to be provided to, via the second AC bus 106, the second set of one or more propulsion components 126, and a second sub-portion of the third portion of the electrical power to be provided to, via the second AC bus 106, the second set of one or more non-propulsion components 130.

As indicated above, FIG. 1 is provided as an example. Other examples may differ from what is described with regard to FIG. 1.

Figure 2:
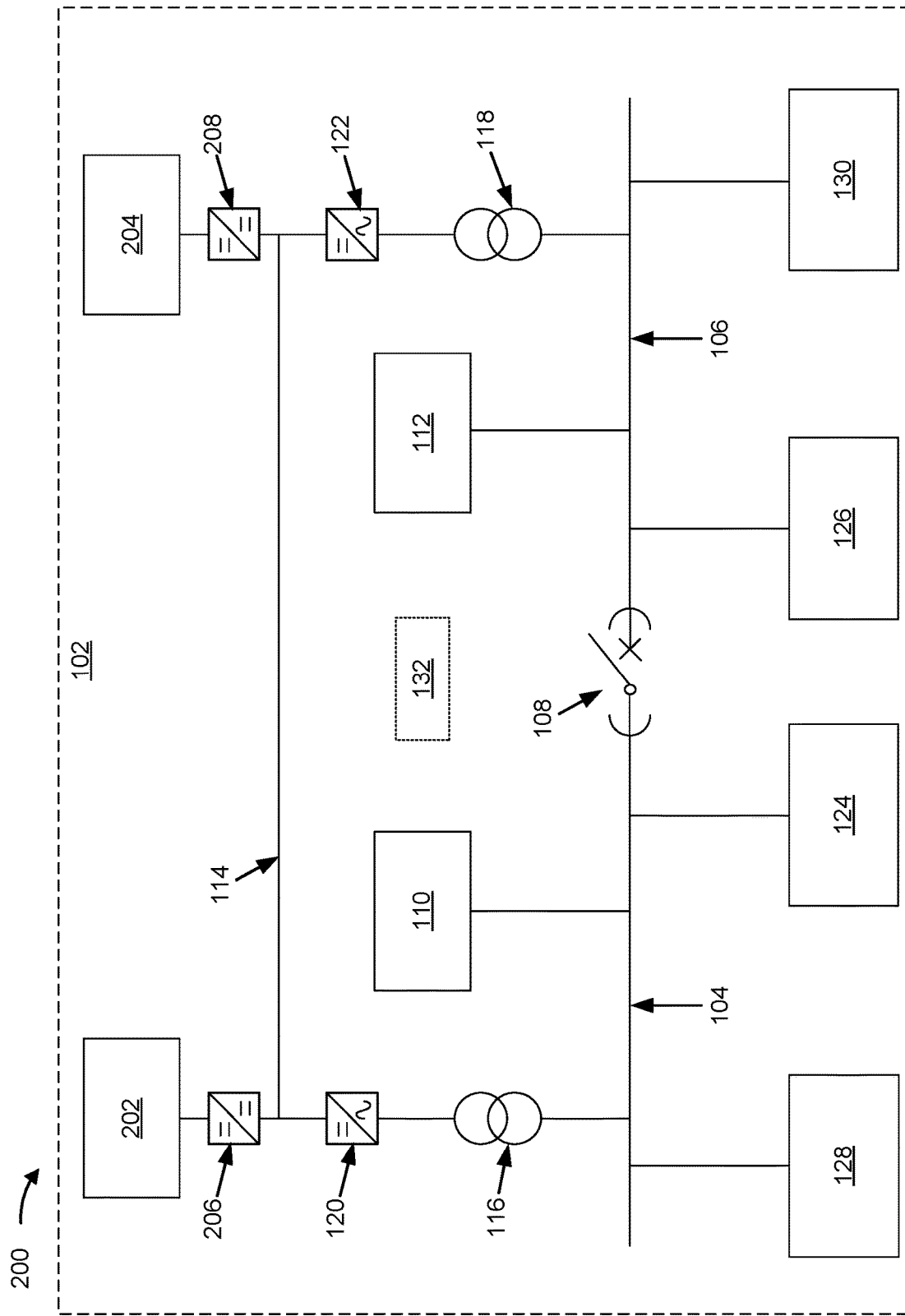
FIG. 2 is a diagram of an example implementation described herein.

FIG. 2 is a diagram of an example implementation 200 described herein. As shown in FIG. 2, the implementation 200 may include another configuration of the power system 102. As further shown in FIG. 2, the power system 102 may additionally include a first energy storage system 202, a second energy storage system 204, a first DC/DC converter 206 (e.g., that is optional), and/or a second DC/DC converter 208 (e.g., that is optional).

Each energy storage system of the first energy storage system 202 and the second energy storage system 204 may be configured to store and provide electrical power. Accordingly, each energy storage system may include one or more batteries, one or more supercapacitors, and/or one or more other components configured to store and provide electrical power. For example, each energy storage system may include one or more batteries, such as one or more lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some implementations, multiple battery cells may be grouped together, in series or in parallel, within a battery module. Multiple battery modules may be grouped together, such as in series, within a battery string. One or more battery strings may be provided within a battery pack, such as a group of battery strings linked together in parallel. Accordingly, each energy storage system may include one or more battery packs, one or more battery strings, one or more battery modules, and/or one or more battery cells.

The first energy storage system 202 and the second energy storage system 204 may each be electrically connected to the DC bus 114. Additionally, the first DC/DC converter 206 may be coupled between the DC bus 114 and the first energy storage system 202, and the second DC/DC converter 208 may be coupled between the DC bus 114 and the second energy storage system 204. Each DC/DC converter, of the first DC/DC converter 206 and the second DC/DC converter 208 may be configured to change (e.g., step up and/or step down) a voltage of electrical power that propagates through the DC/DC converter. This may thereby facilitate propagation of electrical power between the DC bus 114 and the first energy storage system 202 and the second energy storage system 204 (e.g., when the DC bus 114 and the energy storage systems operate at different voltage levels).

At least one of the first energy storage system 202 or the second energy storage system 204 may be configured to provide (e.g., via the first DC/DC converter 206 and/or the second DC/DC converter 208, respectively) electrical power (hereinafter referred to as "other electrical power" to differentiate from the electrical power generated and provided by the first power source 110 to the DC bus 114). For example, when a voltage level associated with a portion of the electrical power provided to the DC bus 114 via the first AC bus 104 by the first power source 110 is less than or equal to a particular voltage level, the first energy storage system 202 and/or the second energy storage system 204 may provide the other electrical power to the DC bus 114. This may allow a portion of the other electrical power to be provided to the second AC bus 106 via the DC bus 114, the second AC/DC inverter 122, and the second transformer 118, and thereby further allow a first sub-portion of the portion of the other electrical power to be provided to, via the second AC bus 106, the second set of one or more propulsion components 126, and a second sub-portion of the portion of the other electrical power to be provided to, via the second AC bus 106, the second set of one or more non-propulsion components 130. Accordingly, the second set of one or more propulsion components 126 and/or the second set of one or more non-propulsion components 130 may be powered by the portion of the other electrical power provided by the first energy storage system 202 and/or the second energy storage system 204 via the second AC bus 106.

As indicated above, FIG. 2 is provided as an example. Other examples may differ from what is described with regard to FIG. 2.

Figure 3:
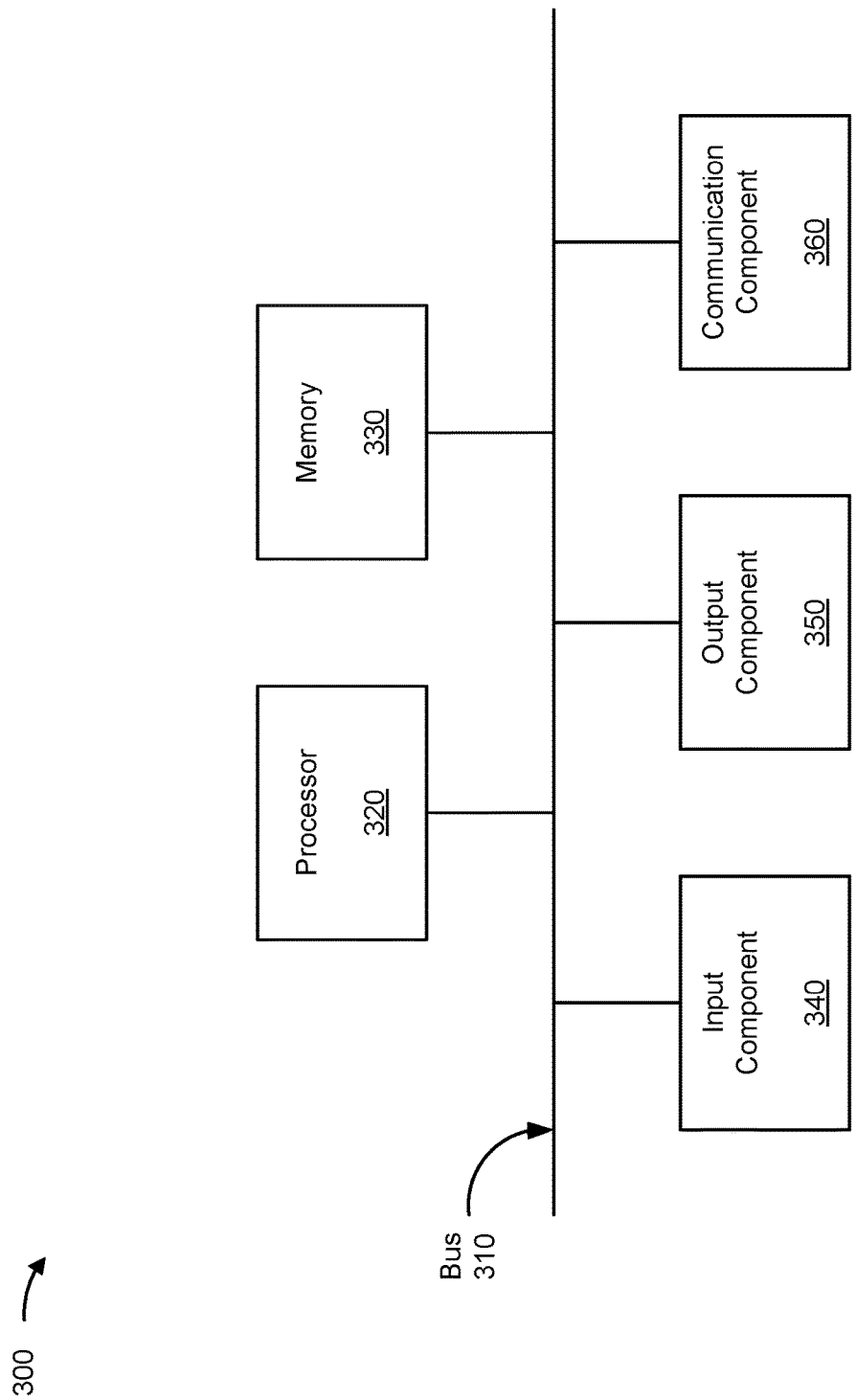
FIG. 3 is a diagram of example components of a device described herein.

FIG. 3 is a diagram of example components of a device 300 described herein. The device 300 may correspond to the controller 132 and/or one or more other components of the power system 102. In some implementations, the controller 132 and/or one or more other components of the power system 102 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. The processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. The memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. Execution of the set of instructions, by one or more processors 320, causes the one or more processors 320 and/or the device 300 to perform one or more operations or processes described herein. Hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
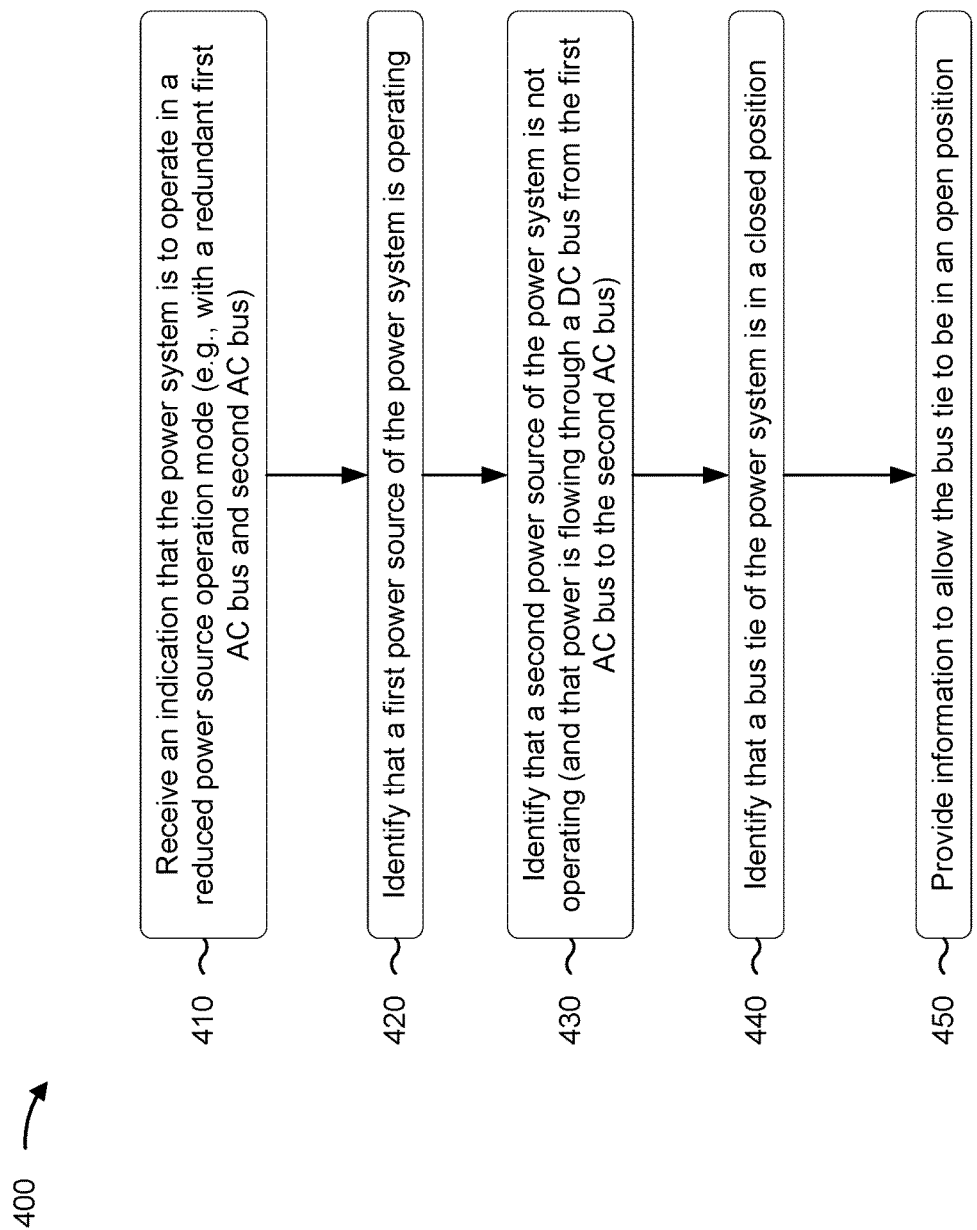
FIG. 4 is a flowchart of an example process associated with reduced power source operation in a power system of a vessel.

FIG. 4 is a flowchart of an example process 400 associated with reduced power source operation in a power system of a vessel. One or more process blocks of FIG. 4 may be performed by a controller (e.g., the controller 132). One or more process blocks of FIG. 4 may be performed by another device or a group of devices separate from or including the controller, such as one or more components of a power system (e.g., the power system 102). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an indication that the power system is to operate in a reduced power source operation mode (e.g., with a redundant first AC bus and second AC bus) (block 410). For example, the controller may receive an indication that the power system is to operate in a reduced power source operation mode (e.g., with a redundant AC bus 104 and AC bus 106), as described above.

As further shown in FIG. 4, process 400 may include identifying that a first power source of the power system is operating (block 420). For example, the controller may identify that a first power source of the power system is operating, as described above.

As further shown in FIG. 4, process 400 may include identifying that a second power source of the power system is not operating (and that power is flowing through a DC bus from the first AC bus to the second AC bus) (block 430). For example, the controller may identify that a second power source of the power system is not operating (and that power is flowing through DC 114 bus from the first AC bus 104 to the second AC bus 106), as described above.

As further shown in FIG. 4, process 400 may include identifying that a bus tie of the power system is in a closed position (block 440). For example, the controller may identify that a bus tie of the power system is in a closed position, as described above.

As further shown in FIG. 4, process 400 may include providing information to allow the bus tie to be in an open position (block 450). For example, the controller may provide information to allow the bus tie to be in an open position, as described above.

Process 400 may include additional implementations, such as any single implementation or any combination of implementations described in connection with one or more other processes described elsewhere herein.

Although FIG. 4 shows example blocks of process 400, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

Some implementations described herein provide a power system of a vessel that includes a first AC bus, a second AC bus, and a DC bus. The first AC bus may be electrically connected to a first power source, a first set of one or more propulsion components of the vessel, and a first set of one or more non-propulsion components of the vessel. The second AC bus may be electrically connected to a second power source, a second set of one or more propulsion components of the vessel, and a second set of one or more non-propulsion components of the vessel. The power system may include a bus tie that electrically connects the first AC bus and the second AC bus when in a closed position, and that electrically disconnects the first AC bus and the second AC bus when in an open position. The power system may also include a first transformer that galvanically isolates the DC bus from the first AC bus, a second transformer that galvanically isolates the DC bus from the second AC bus, a first AC/DC inverter coupled between the first AC bus and the DC bus, and a second AC/DC inverter coupled between the second AC bus and the DC bus.

Accordingly, the power system may operate in a reduced power source operation mode, where the first power source operates and the second power source does not operate, and the bus tie is in the open position. This allows the first power source power source to provide electrical power to the first AC bus, which allows respective portions of the electrical power to be provided to the first set of one or more propulsion components and the first set of one or more non-propulsion components via the first AC bus, and another portion of the electrical power to be provided to the second AC bus via the first AC bus, the first transformer, the first AC/DC inverter, the DC bus, the second AC/DC inverter, and/or the second transformer. This further allows respective sub-portions of the other portion of the electrical power to be provided to the second set of one or more propulsion components and the second set of one or more non-propulsion components via the second AC bus.

In this way, the second power source does not need to operate (e.g., to generate and provide additional electrical power) to power components that are electrically connected to the second AC bus when the bus tie is in the open position, because the first power source 110 is operating and providing electrical power to the second AC bus via the DC bus. Therefore, an amount of fuel consumed by the second power source (e.g., when the power system is operating in the reduced power source operation mode) is reduced (or eliminated), which also reduces (or eliminates) unwanted emissions and therefore reduces an environmental impact of operating the power system. Further, because the second power source is not operating, an amount of wear-and-tear on the second power source is reduced, which improves its longevity.

Additionally, in some implementations, the power system may include a first energy storage system and a second energy storage system that are configured to provide other electrical power to the DC bus (e.g., when a voltage level associated with a portion of the electrical power provided to the DC bus via the first AC bus by the first power source is less than or equal to a particular voltage level) to allow a portion of the other electrical power to be provided to the second AC bus via the DC bus, the second AC/DC inverter, and the second transformer, and thereby further allow respective sub-portions of the portion of the other electrical power to be provided to the second set of one or more propulsion components and the second set of one or more non-propulsion components via the second AC bus. This facilitates optimal powering of the second set of one or more propulsion components and the second set of one or more non-propulsion components, and therefore a need to operate the second power source is further reduced.

Further, in some implementations, the power system may include a controller that receives an in indication that the power system is to operate in the reduced power source operation mode, and may thereby identify and provide information that allows the bus tie to be in the open position (e.g., to be adjusted from the closed position to the open position). In this way, the controller ensures that the power system is ready to operate in the reduced power source operation mode before the bus tie is adjusted to the open position. This thereby further facilitates efficient use of fuel, and a reduction in unwanted emissions, by ensuring that only the first power source is operating when the power system enters the reduced power source operation mode.

What is claimed is:

1. A power system of a vessel, comprising:
   a first AC bus;
   a second AC bus;
   a bus tie that electrically connects the first AC bus and the second AC bus when in a closed position, and that electrically disconnects the first AC bus and the second AC bus when in an open position;
   a first power source that is electrically connected to the first AC bus;
   a second power source that is electrically connected to the second AC bus;
   a DC bus;
   a first transformer that galvanically isolates the DC bus from the first AC bus;
   a second transformer that galvanically isolates the DC bus from the second AC bus;
   a first AC/DC inverter coupled between the first AC bus and the DC bus;
   a second AC/DC inverter coupled between the second AC bus and the DC bus;
   a first set of one or more propulsion components of the vessel that are electrically connected to the first AC bus;
   a second set of one or more propulsion components of the vessel that are electrically connected to the second AC bus;
   a first set of one or more non-propulsion components of the vessel that are electrically connected to the first AC bus; and
   a second set of one or more non-propulsion components of the vessel that are electrically connected to the second AC bus, wherein:
      the first power source, when the first power source is operating, is configured to provide electrical power to the first AC bus,
         wherein, when the second power source is not operating and the bus tie is in the open position, the first power source providing the electrical power to the first AC bus allows:
            a first portion of the electrical power to be provided to the first set of one or more propulsion components via the first AC bus,
            a second portion of the electrical power to be provided to the first set of one or more non-propulsion components via the first AC bus, and
            a third portion of the electrical power to be provided to the second AC bus via the first AC bus, the first transformer, the first AC/DC inverter, the DC bus, the second AC/DC inverter, and the second transformer, wherein:
               a first sub-portion of the third portion of the electrical power is provided to, via the second AC bus, the second set of one or more propulsion components, and
               a second sub-portion of the third portion of the electrical power is provided to, via the second AC bus, the second set of one or more non-propulsion components.

2. The power system of claim 1, further comprising:
   a first energy storage system that is electrically connected to the DC bus; and
   a second energy storage system that is electrically connected to the DC bus.

3. The power system of claim 2, further comprising at least one of:
   a first DC/DC converter coupled between the DC bus and the first energy storage system; or
   a second DC/DC converter coupled between the DC bus and the second energy storage system.

4. The power system of claim 2, wherein:
   at least one of the first energy storage system or the second energy storage system are configured to provide other electrical power to the DC bus,
      wherein providing the other electrical power to the DC bus allows a portion of the other electrical power to be provided to the second AC bus via the DC bus, the second AC/DC inverter, and the second transformer, wherein:
         a first sub-portion of the portion of the other electrical power is provided to, via the second AC bus, the second set of one or more propulsion components, and
         a second sub-portion of the portion of the other electrical power is provided to, via the second AC bus, the second set of one or more non-propulsion components.

5. The power system of claim 1, further comprising a controller, wherein the controller is configured to:
   receive an indication that the power system is to operate in a reduced power source operation mode;
   identify, based on receiving the indication that the power system is operate in the reduced power source operation mode, that the first power source is operating, that the second power source is not operating, and that the bus tie is in the closed position; and
   provide, based on identifying that the first power source is operating, that the second power source is not operating, and that the bus tie is in the closed position, information indicating that the first power source is operating, that the second power source is not operating, and that the bus tie is in the closed position to allow the bus tie to be in the open position.

6. The power system of claim 5, wherein the controller receives the indication that the power system is to operate in a reduced power source operation from a user interface of the vessel.

7. The power system of claim 1, further comprising a controller, wherein the controller is configured to:
   receive an indication that the power system is to operate in a reduced power source operation mode; and
   provide, based on receiving the indication that the power system is operate in the reduced power source operation mode, information indicating that the first power source is operating, that the second power source is not operating, and that the bus tie is in the closed position to allow the bus tie to be in the open position.

8. A power system of a vessel, comprising:
   a first AC bus;
   a second AC bus;
   a bus tie that electrically connects the first AC bus and the second AC bus when in a closed position, and that electrically disconnects the first AC bus and the second AC bus when in an open position;
   a first power source that is electrically connected to the first AC bus;
   a second power source that is electrically connected to the second AC bus;
   a DC bus;
   a first AC/DC inverter coupled between the first AC bus and the DC bus;
   a second AC/DC inverter coupled between the second AC bus and the DC bus;

a first set of one or more non-propulsion components of the vessel that are electrically connected to the first AC bus; and
a second set of one or more non-propulsion components of the vessel that are electrically connected to the second AC bus, wherein:
the first power source, when the first power source is operating, is configured to provide electrical power to the first AC bus,
wherein, when the second power source is not operating and the bus tie is in the open position, the first power source providing the electrical power to the first AC bus allows:
a portion of the electrical power to be provided to the second AC bus via the first AC bus, the first AC/DC inverter, the DC bus, and the second AC/DC inverter, wherein:
a sub-portion of the portion of the electrical power is provided to, via the second AC bus, the second set of one or more non-propulsion components.

9. The power system of claim 8, further comprising:
a first transformer that galvanically isolates the DC bus from the first AC bus; and
a second transformer that galvanically isolates the DC bus from the second AC bus.

10. The power system of claim 8, further comprising:
a first set of one or more propulsion components of the vessel that are electrically connected to the first AC bus; and
a second set of one or more propulsion components of the vessel that are electrically connected to the second AC bus,
wherein, when the second power source is not operating and the bus tie is in the open position, the first power source providing the electrical power to the first AC bus further allows:
another portion of the electrical power to be provided to the first set of one or more propulsion components via the first AC bus, and
another sub-portion of the portion of the electrical power to be provided to, via the second AC bus, the second set of one or more propulsion components.

11. The power system of claim 8, further comprising:
a first energy storage system that is electrically connected to the DC bus; and
a second energy storage system that is electrically connected to the DC bus.

12. The power system of claim 11, further comprising:
a first DC/DC converter coupled between the DC bus and the first energy storage system; and
a second DC/DC converter coupled between the DC bus and the second energy storage system.

13. The power system of claim 11, wherein:
at least one of the first energy storage system or the second energy storage system are configured to provide other electrical power to the DC bus,
wherein providing the other electrical power to the DC bus allows a portion of the other electrical power to be provided to the second AC bus via the DC bus and the second AC/DC inverter, wherein:
a sub-portion of the portion of the other electrical power is provided to, via the second AC bus, the second set of one or more non-propulsion components.

14. The power system of claim 8, further comprising a controller, wherein the controller is configured to:
receive an indication that the power system is to operate in a reduced power source operation mode; and
identify, based on receiving the indication that the power system is operate in the reduced power source operation mode, that the first power source is operating, that the second power source is not operating, and that the bus tie is in the closed position; and
provide, based on identifying that the first power source is operating, that the second power source is not operating, and that the bus tie is in the closed position, information indicating that the first power source is operating, that the second power source is not operating, and that the bus tie is in the closed position to allow the bus tie to be in the open position.

15. The power system of claim 8, further comprising a controller, wherein the controller is configured to:
receive an indication that the power system is to operate in a reduced power source operation mode; and
provide, based on receiving the indication that the power system is operate in the reduced power source operation mode, information indicating that the first power source is operating, that the second power source is not operating, and that the bus tie is in the closed position to allow the bus tie to be in the open position.

16. The power system of claim 15, wherein the controller receives the indication that the power system is to operate in a reduced power source operation from a user interface of the vessel.

17. A method, comprising:
receiving, by a controller of a power system of a vessel, an indication that the power system is to operate in a reduced power source operation mode;
identifying, by the controller and based on receiving the indication that the power system is to operate in the reduced power source operation mode, that a first power source of the power system is operating,
wherein the first power source is electrically connected to a first AC bus of the power system;
identifying, by the controller and based on receiving the indication that the power system is to operate in the reduced power source operation mode, that a second power source of the power system is not operating,
wherein the second power source is electrically connected to a second AC bus of the power system;
identifying, by the controller and based on receiving the indication that the power system is to operate in the reduced power source operation mode, that a bus tie of the power system is in a closed position,
wherein the bus tie electrically connects the first AC bus and the second AC bus when in the closed position, and electrically disconnects the first AC bus and the second AC bus when in an open position; and
providing, by the controller and based on receiving the indication that the power system is to operate in the reduced power source operation mode, identifying that the first power source is operating, identifying that the second power source is not operating, and identifying that the bus tie is in the closed position, information indicating that the first power source is operating, that the second power source is not operating, and that the bus tie is in the closed position,
wherein providing the information indicating that the first power source is operating, that the second power source is not operating, and that the bus tie is in the closed position allows the bus tie to be in the open position, which allows the first power source to provide electrical power to the first AC bus,
wherein the first power source providing the electrical power to the first AC bus allows a portion of the electrical power to be provided to the second AC bus via the first AC bus, a first AC/DC inverter of the power system, a DC bus of the power system, and a second AC/DC inverter of the power system.

18. The method of claim 17, wherein the indication that the power system is to operate in a reduced power source operation is received from a user interface of the vessel.

19. The method of claim 17, wherein the first power source providing the electrical power to the first AC bus further allows another portion of the electrical power to be provided to, via the first AC bus, a set of one or more non-propulsion components of the vessel that are electrically connected to the first AC bus.

20. The method of claim 17, wherein the first power source providing the electrical power to the first AC bus further allows a sub-portion of the portion of the electrical power to be provided to, via the second AC bus, a set of one or more non-propulsion components of the vessel that are electrically connected to the second AC bus.

* * * * *